(No Model.)

J. KNIGHT.
LAWN RAKE AND GRASS RECEIVER.

No. 501,430. Patented July 11, 1893.

Witnesses:
Murray C. Boyer
Frank E. Bechtold

Inventor:
James Knight
by his Attorneys
Howson & Howson

UNITED STATES PATENT OFFICE.

JAMES KNIGHT, OF PHILADELPHIA, PENNSYLVANIA.

LAWN-RAKE AND GRASS-RECEIVER.

SPECIFICATION forming part of Letters Patent No. 501,430, dated July 11, 1893.

Application filed February 1, 1893. Serial No. 460,591. (No model.)

*To all whom it may concern:*

Be it known that I, JAMES KNIGHT, a citizen of the United States, and a resident of Philadelphia, Pennsylvania, have invented a certain Improved Lawn-Rake and Grass-Receiver, of which the following is a specification.

The object of my invention is to provide an effective device for gathering up the cut grass after a mower has passed over a lawn, said device consisting of the combined lawn rake and grass receiver fully described hereinafter, reference being had to the accompanying drawings, in which—

Figure 1:
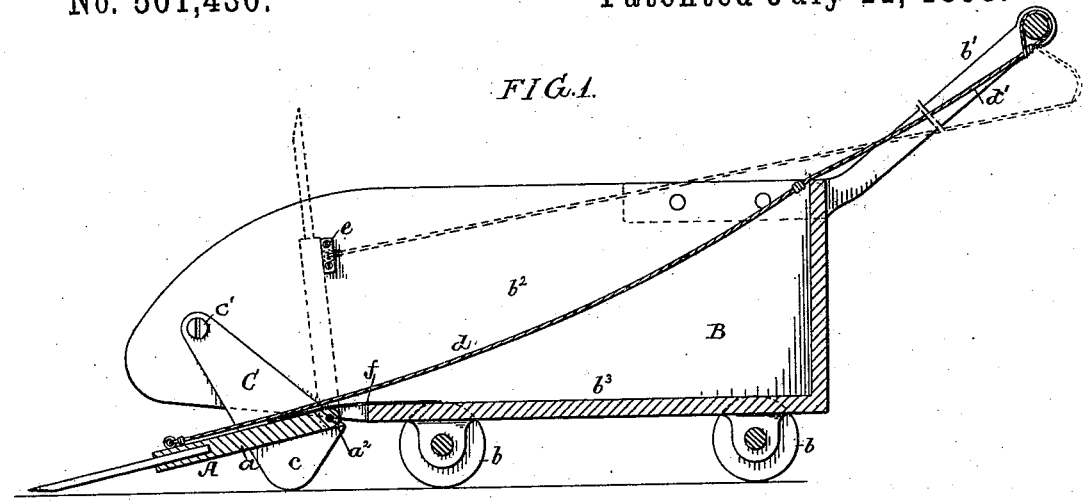
Figure 2:
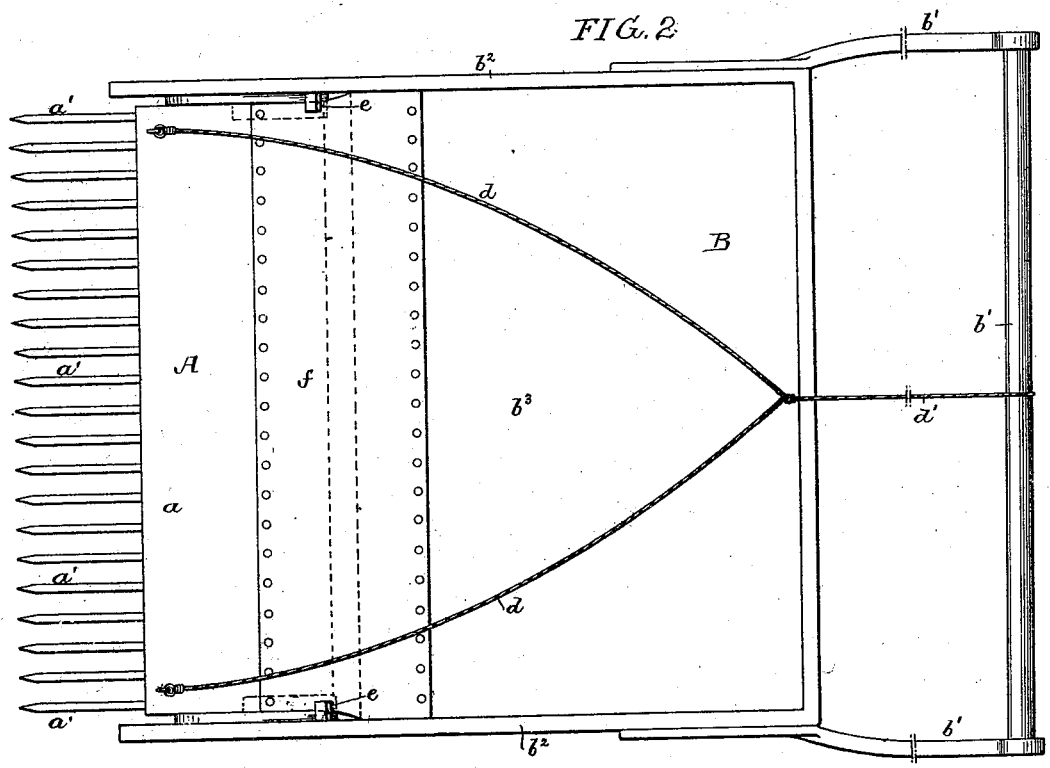
Figure 3:
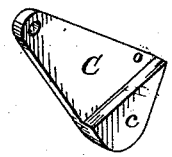

Figure 1, is a longitudinal section of my improved lawn rake and grass receiver, the position of the rake when dumping grass into the receiver being shown in dotted lines. Fig. 2, is a plan view of the device; and Fig. 3, is a detached perspective view of one of the parts of the device.

A represents the rake suitably mounted in the front part of the grass receiver or barrow B. The barrow B is mounted on four small wheels $b$, and is provided with a handle $b'$, by which it may be pushed along the ground. The barrow may be of any suitable shape and dimensions.

The rake is constructed as follows:—The raking teeth $a'$ are mounted in a bar $a$, which is hung upon a rod or wire $a^2$ and this rod or wire is carried by arms C which are pivotally hung at their upper ends $c'$ to the sides $b^2$ of the barrow B, and at their lower ends trail upon the ground in advance of the supporting wheels of the barrow. The arms C may also have supporting wheels if desired. To prevent the raking teeth from digging into the ground, the bar $a$ which carries them rests on projections $c$ which form a part of the arms C. These projections support the bar $a$ at an angle and the raking teeth are beveled on their inner sides so that they are, at all times, a sufficient distance above the ground to catch the grass, but run no danger of digging into the ground and being thereby bent or broken. The arms C with their supporting projections might also be used in connection with a rake pivoted to the barrow, instead of to the arms, although the latter construction is the preferable one.

Attached to each side of the rake are cords $d$, which unite in a single cord $d'$ at the rear of the barrow, said cord $d'$ being fastened to the handle $b'$. When a sufficient quantity of grass has been collected on the rake the cord $d'$ is pulled and the rake lifted so as to throw the grass into the barrow. In order that the rake may fall back to its normal position immediately, stops $e$ are mounted on the sides of the barrow, these stops being so placed that the rake is still inclined forward when it strikes them, and hence will drop into its operative position as soon as the cord $d'$ is released. A flexible strip $f$ is fastened to the bar $a$ and to the bottom $b^3$ of the barrow in order to cover the space between the two so that the grass will not drop through this space and tend to clog the apparatus.

Having thus described my invention, I claim and desire to secure by Letters Patent—

1. The combination in a lawn rake and grass receiver, of the grass receiving barrow having a flat bottom, a pivoted rake at the front of the barrow having a bar forming a downwardly inclined continuation of said bottom of the receiver, and cords secured to the rake and passing rearward so that when they are pulled the rake will be lifted and the grass will be thrown back into the barrow, substantially as described.

2. The combination of the receiving barrow, arms pivoted to the barrow, and resting upon the ground, projections on said arms, and a pivoted rake having a bearing upon said projections whereby the teeth are prevented from touching the ground, substantially as specified.

3. The combination of the receiving barrow, arms pivoted to the barrow and resting upon the ground, projections on said arms, and a rake pivoted to the arms and having a bearing upon said projections, substantially as specified.

4. The combination of the barrow, the pivoted rake having straight teeth beveled on their under sides at the points, and supports for preventing the undue dropping of the points of the teeth, substantially as specified.

5. The combination of the barrow, the pivoted rake at the front of the same, supports for preventing the dropping of said rake, means for lifting the rake, so as to throw the grass back into the barrow, and a flexible apron covering the joint between the rake bar
5 and the bottom of the bar, substantially as specified.

In testimony whereof I have signed my name to this specification in the presence of two subscribing witnesses.

JAMES KNIGHT.

Witnesses:
JOSEPH H. KLEIN,
HARRY SMITH.